(No Model.) 2 Sheets—Sheet 1.
F. N. ELLITHORPE.
FRUIT ASSORTER.
No. 399,509. Patented Mar. 12, 1889.
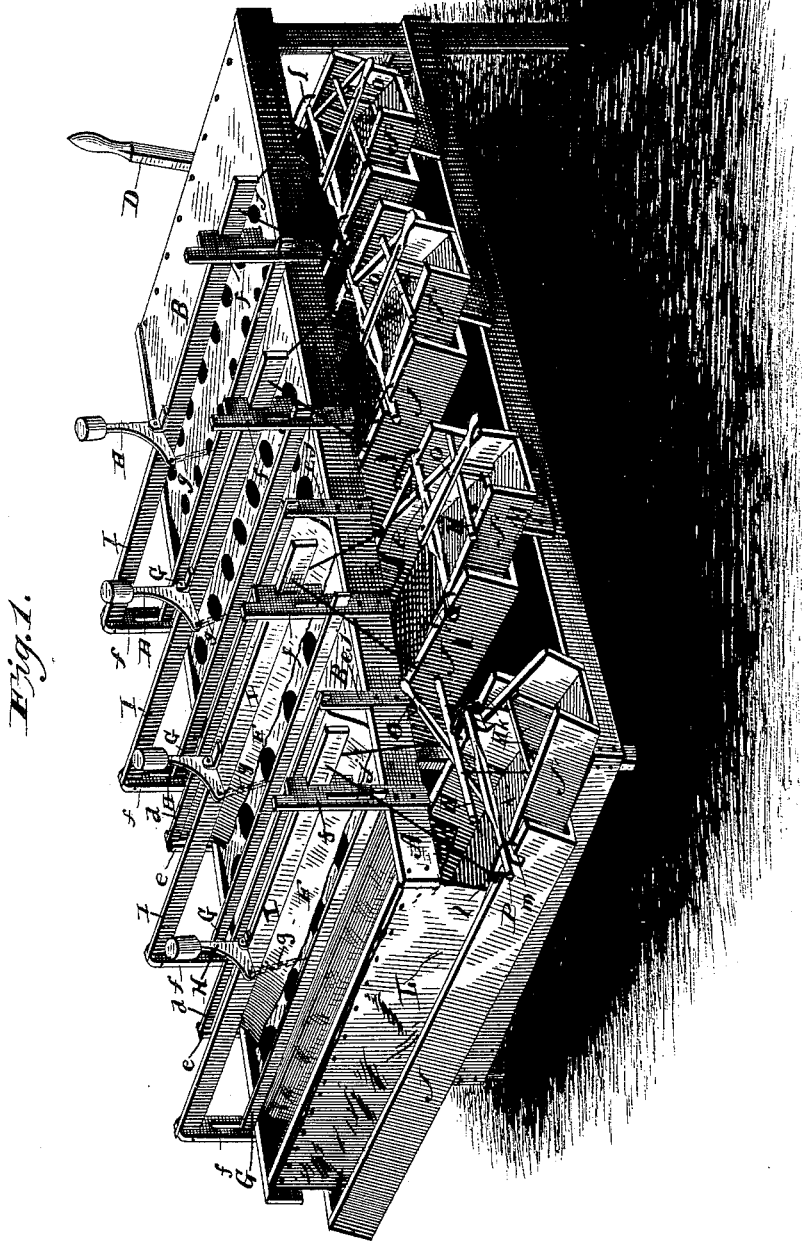
WITNESSES.
INVENTOR.
F. N. Ellithorpe
By C. M. Alexander
Attorney.

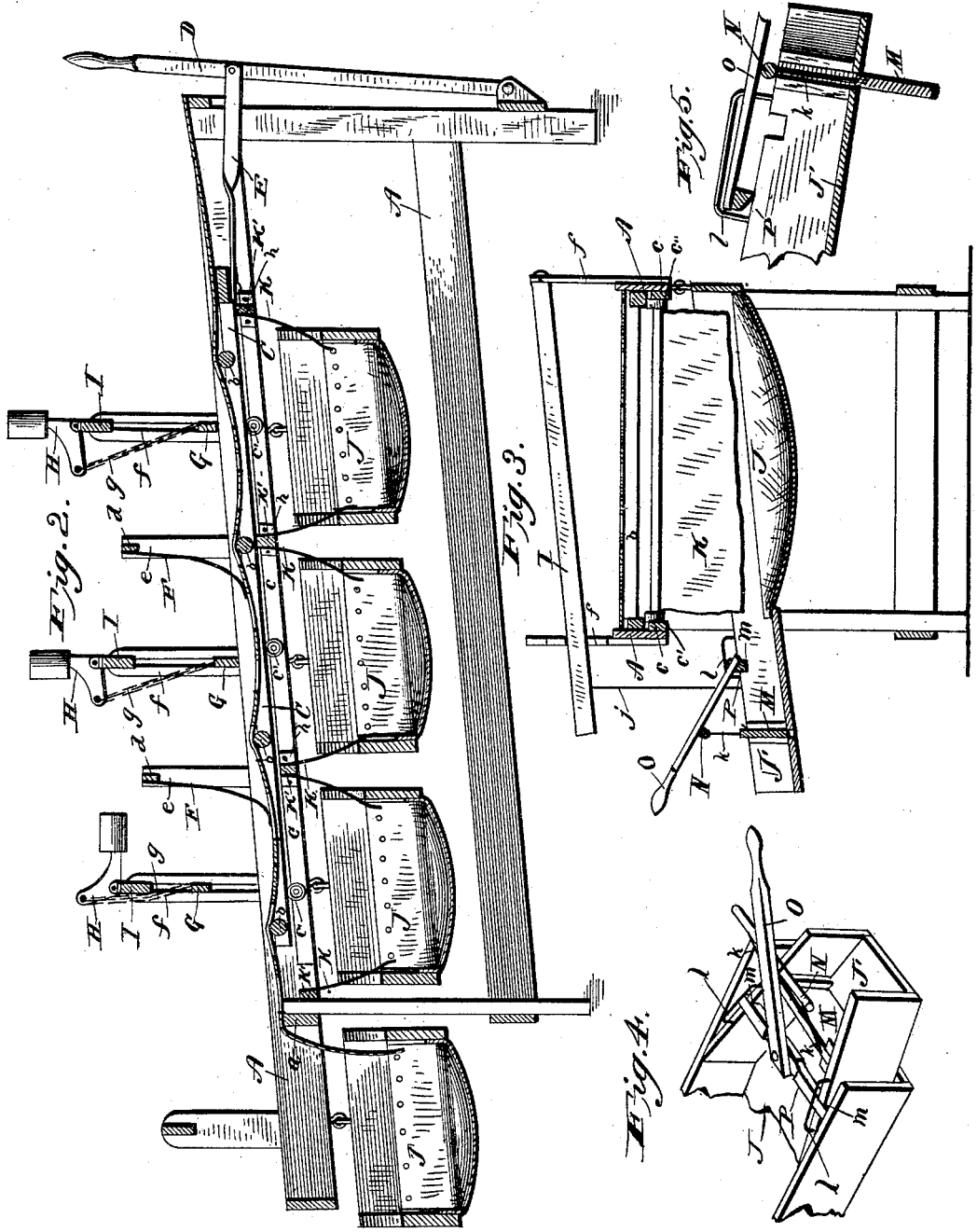

UNITED STATES PATENT OFFICE.

FRANK N. ELLITHORPE, OF PORT CLINTON, OHIO.

FRUIT-ASSORTER.

SPECIFICATION forming part of Letters Patent No. 399,509, dated March 12, 1889.

Application filed October 11, 1888. Serial No. 287,785. (No model.)

*To all whom it may concern:*

Be it known that I, FRANK N. ELLITHORPE, a citizen of the United States, residing at Port Clinton, in the county of Ottawa and State of Ohio, have invented certain new and useful Improvements in Fruit-Assorters, of which the following is a specification, reference being had therein to the accompanying drawings, in which—

Figure 1 represents a perspective view of my improved assorting-machine complete; Fig. 2, a longitudinal vertical sectional view of the machine; Fig. 3, a transverse sectional view of the same; Fig. 4, a detail view showing construction of spout cut-off or gate; and Fig. 5, a detail sectional view of the spout, the gate being shown open.

The invention has mainly for its object the production of practical, durable, and inexpensive apparatus that will rapidly and effectually assort the fruit—such as apples, pears, peaches, quinces, &c.—and conduct the several different sizes to their respective baskets or other receptacles without in the least injuring or bruising it, as will be more fully hereinafter set forth.

The invention consists in certain novel features of construction and arrangement of parts, that will be fully hereinafter set forth, and particularly pointed out in the claims.

Referring to the annexed drawings by letters, A designates a suitable inclined rectangular frame or table suitably supported and braced. Secured to the forward or front end of this frame, and reaching almost to the rear end thereof, is a loose flexible inclined diaphragm, B, which fits freely between the side rails of the frame. The only point of connection this diaphragm has with the frame is at its forward end, the rear end of the diaphragm hanging down over the cross-bar $a$ at or near the rear end of the machine. This flexible diaphragm, which is made of canvas, leather, rubber, or other suitable material, is provided with several series of transverse rows of circular holes for the passage of the fruit, each series of rows of apertures, beginning at the top or forward end, being slightly larger in diameter than the preceding series, whereby the smallest fruit will drop through the first series of apertures, the next size through the next series, and so on down the diaphragm, the largest fruit falling over the lower or rear end of the same. Any number of these series of separating-apertures may be formed in the diaphragm, as is evident.

Arranged directly beneath the diaphragm, so as to support the same, is a reciprocating agitating-frame, C, which is provided with transverse rollers or slides $b$ and rests and works upon ways $c$, secured upon the inner sides of the side rails of the frame. These ways may or may not be provided with antifriction rollers $c'$ on their upper surface, as may be desired. This agitating-frame is reciprocated by means of a lever, D, pivoted on the forward end of the main frame and connected to the agitator-frame by means of a link or bar, E. When this frame C is reciprocated, it serves to agitate the fruit on the diaphragm and keep it in continuous motion and prevent it lodging in and stopping up the apertures, as is obvious.

Placed at suitable points along the diaphragm are depending retarders F, which consist of a suitable piece of canvas or other flexible material secured to a transverse bar or rod, $d$, removably supported in notched standards $e$, secured to the side of the stationary frame. The lower edge of the flexible material rests loosely upon the upper surface of the diaphragm. The object of these retarders is to prevent the fruit from rolling too rapidly down the inclined surface of the diaphragm. One or more of these retarders may be employed, as the exigencies of the case may require, as they are easily removable from the standards.

Vertically-movable transverse bars G are arranged at suitable points along the table or frame for temporarily stopping the fruit at any point during its passage down the diaphragm, for the purpose of removing the decayed or bad fruit before it passes through the diaphragm. These bars may be guided vertically in any suitable manner, in this instance their ends working in vertical slots in suitable standard, $f$, erected on the frame A. These bars G are held up out of the way by means of weighted angle-levers H, pivoted upon transverse levers or bars I, and connected to the said bars G by means of chains $g$. One or more of these bars G may be employed. Suitably hung below each series of transverse holes is an inclined receiving-trough, J, provided with a canvas or other flexible bottom, and a spout, J', at its lower end. Depending from the frame A, and arranged transversely of the machine under the agitator, are suitable flexible separators, K, which direct the fruit without bruising it into the respective troughs J. These flexible separators are secured to removable transverse rods K', resting in notched blocks $h$ on the frame A or ways $c$. The spout or lower end of these troughs may be elevated, if desired, by means of the levers I, pivoted to one of the standards $f$, and connected to the trough by means of the wire connections $j$. One of each pair of said standards $f$ is notched for the reception of the free end of the lever to hold the trough in an elevated position. When baskets or other receptacles are placed under the spouts J', the lever may be disengaged from the notched standard and the trough or spout allowed to rest upon the top of the basket. The upper ends of the troughs are pivotally connected to the frame A by any suitable means—in this instance eyebolts being employed.

A trough is arranged beneath the exit end of the machine, to receive the fruit that does not pass through the holes in the diaphragm. A depending piece of canvas or other suitable material, L, is attached to the rear end of the frame, to direct the fruit into the last trough.

Adapted to close the spouts J' are the vertically-working gates M, working in transverse slots in the bottoms of the troughs and between suitable cleats or ways on the inner converging sides of the spouts. These gates are operated by any suitable means, but preferably in the manner shown in Figs. 3 and 4. Connected to the upper edges of the gates M by means of links or rods $k$ $k$ are transverse rods N, the ends of which rest upon the upper edges of the troughs when the gates are open, as shown in Fig. 5. Secured rigidly to these rods N are the operating hand-levers O, the ends of which are also secured rigidly to transverse rectangular bars P, resting upon the upper edges of the troughs and confined thereon by means of the confining-staples $l$, secured in the upper edges of the troughs or spouts. Square notches $m$ are formed in the upper edges of the troughs or spouts for the reception of the ends of the bars P. When the gates are raised, as shown in Figs. 3 and 4, and the rectangular bars P dropped into the notches $m$, they will be held in such elevated (or closed) positions, the said rectangular bars being prevented from turning by the rectangular apertures. When the bars P are lifted out of the notches $m$, the gates fall (or open) automatically to the position shown in Fig. 5.

Having thus fully described my invention, what I claim as new, and desire to secure by Letters Patent, is—

1. In a fruit-assorter, the combination of a frame, an inclined loose flexible perforated separating-diaphragm connected at its upper end to the said frame, and an agitating device arranged beneath the said loose diaphragm.

2. In a fruit-assorter, the combination of a supporting-frame, a loose flexible perforated diaphragm connected to the frame, an agitating-frame arranged below and adapted to support this diaphragm, and means for giving this agitating-frame a longitudinal movement under the diaphragm, substantially as described.

3. In a fruit-assorter, the combination of a frame, a flexible inclined perforated diaphragm, and a transverse depending retarder, F, this retarder being constructed of flexible material, and having its lower edge resting upon the said flexible diaphragm, substantially as and for the purpose set forth.

4. The combination, with the inclined flexible diaphragm provided with different-sized holes, of a reciprocating agitating-frame arranged beneath and adapted to support the said diaphragm and provided with transverse rollers.

5. The combination of a frame, a perforated diaphragm, a support above this diaphragm, a vertically-guided stop-bar, G, a pivoted weighted angle-lever upon the said support, and a chain connecting the angle-lever and stop-bar, substantially as and for the purpose set forth.

6. The combination of a trough, a spout attached thereto and provided with the notches $m$, a vertically-movable gate, the transverse bars connected together by means of the hand-lever and to the gate by suitable connecting-rods, and the confining staples or loops secured over the notches $m$, substantially as described.

In testimony whereof I affix my signature in presence of two witnesses.

FRANK N. ELLITHORPE.

Witnesses:
 LEON NEWTON,
 MILES NEWTON.